(12) United States Patent
Aufrere et al.

(10) Patent No.: US 6,254,181 B1
(45) Date of Patent: Jul. 3, 2001

(54) VEHICLE SEAT HAVING A MOVABLE SAFETY BAR

(75) Inventors: Christophe Aufrere, Marcoussis; Gerald Morin, Paris; Erik Levernieux, Etampes, all of (FR)

(73) Assignee: Bertrand Faure Equipements SA, Boulogne (FR)

( * ) Notice: Subject to any disclaimer, the term of this patent is extended or adjusted under 35 U.S.C. 154(b) by 0 days.

(21) Appl. No.: 09/489,298

(22) Filed: Jan. 21, 2000

(51) Int. Cl.[7] .................................................. B60N 2/427
(52) U.S. Cl. .................................. 297/216.1; 297/216.13
(58) Field of Search ........................... 297/216.1, 216.13, 297/216.14, 284.11; 296/68.1

(56) References Cited

U.S. PATENT DOCUMENTS

| | | | |
|---|---|---|---|
| 4,623,192 | 11/1986 | Koide et al. | 297/216 |
| 5,340,185 | 8/1994 | Vollmer | 286/68.1 |
| 6,050,635 | * 4/2000 | Pajon et al. | 297/216.1 |
| 6,113,185 | * 9/2000 | Yamaguchi et al. | 297/216.1 |

FOREIGN PATENT DOCUMENTS

| | | |
|---|---|---|
| 36 31 881 | 4/1988 | (DE) . |
| 38 41 688 | 6/1990 | (DE) . |
| 42 12 254 | 4/1993 | (DE) . |
| 298 15 521 | 1/1999 | (DE) . |
| 2 641 244 | 6/1990 | (FR) . |
| 2 747 080 | 10/1997 | (FR) . |
| 2 747 081 | 10/1997 | (FR) . |

OTHER PUBLICATIONS

First page of WO 00/12350.

* cited by examiner

Primary Examiner—Peter R. Brown
(74) Attorney, Agent, or Firm—Marshall, O'Toole, Gerstein, Murray & Borun

(57) ABSTRACT

A vehicle seat has a horizontal safety bar which restricts the displacement of the occupant in the event of an accident. This bar is moved towards the occupant by means of an activating device in the event of an accident, following a certain activation trajectory, after which the bar is displaced in the opposite direction applying deceleration on a dissipation trajectory, the initial portion of which follows the final portion of the activation trajectory.

13 Claims, 6 Drawing Sheets

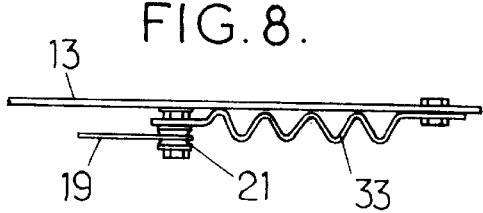
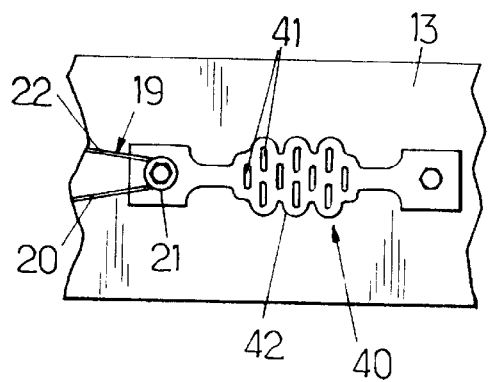
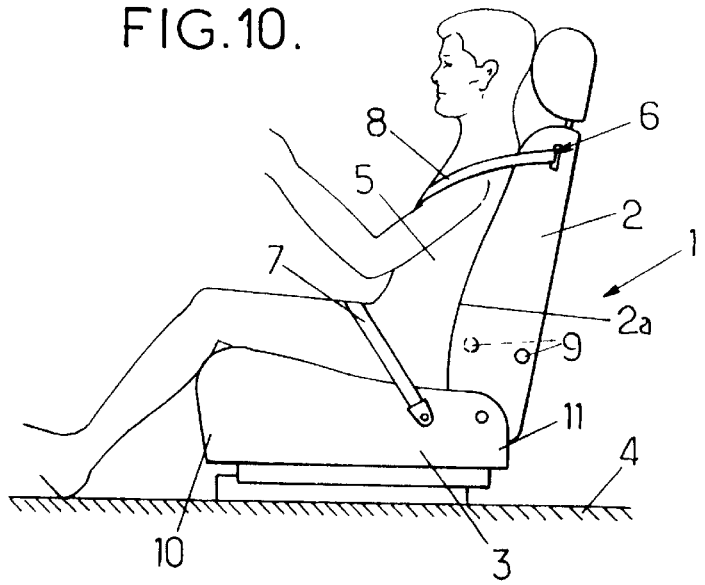

VEHICLE SEAT HAVING A MOVABLE SAFETY BAR

FIELD OF THE INVENTION

The present invention relates to vehicle seats having movable safety bars designed to improve the safety of the occupant of the seat in the event of an accident.

More specifically, the invention relates to a vehicle seat comprising:

a backrest, a seat extending in a longitudinal direction between a front end and a rear end adjacent to the backrest, a safety bar extending horizontally, perpendicular to the longitudinal direction, inside a seating element selected from the seat and the backrest, this seating element having a support surface designed to support an occupant, the safety bar being designed to restrict displacement of the occupant in a certain direction of displacement in the event of an accident, said safety bar being arranged, under normal circumstances, in a set-back position relative to the seating element, which is spaced back from the support surface, relatively speaking, connecting means for connecting the safety bar to the seating element, at least one activating device which can be triggered in the event of an accident in order to displace the safety bar relative to the seating element from its set-back position into an activated position closer to the support surface of the seating element, the connecting means being designed so that the safety bar follows a predetermined activation trajectory relative to the seating element until it reaches said activated position, and energy-dissipating means designed to decelerate the safety bar as it is displaced from its activated position to an end-of-travel position, during which it follows a certain dissipation trajectory directed substantially in the direction in which the occupant is displaced in the event of an accident.

BACKGROUND OF THE INVENTION

Safety bars of this type are known in the form of what are referred to as "anti-submarining" bars, their purpose being to prevent the occupant of the seat from sliding underneath the ventral strap of his safety belt and being forced into the upholstery of the seat if the vehicle is subjected to a frontal impact.

Document FR-A-2 747 080 describes an example of a seat in which a safety bar of this type is pivotally mounted on connecting plates and is moved upwards and forwards under the action of a pyrotechnic pre-tensioning device if the vehicle is subjected to a frontal impact. These features prevent the safety bar from impinging on the comfort of the occupant under normal circumstances, yet make it effective when moved into the activated position in the event of an accident.

The disadvantage of this known seat is that when the safety bar is in the set-back position it is located towards the rear of the seat, relatively speaking, at a point where the seat upholstery and the elastic metal layer supporting this upholstery are susceptible to local deformation under the weight of the occupant and may impair or even prevent correct displacement of the safety bar into its activated position in the event of an accident.

This being the case, the safety bar remains locked in a rear position and is unable to fulfil its function which means that the pelvis of the occupant is at risk of digging in as it moves forward underneath the ventral strap of the safety belt when subjected to impact, which can cause serious injury to the occupant.

OBJECTS AND SUMMARY OF THE INVENTION

The specific objective of the invention is to overcome this drawback.

To this end, the invention proposes a seat of the type in question which is essentially characterised in that the connecting means are designed so that the activation trajectory followed by the safety bar relative to the seating element comprises at least one portion common to the dissipation trajectory, this portion of the activation trajectory commencing at an intermediate point on the dissipation trajectory and continuing as far as the activated position.

As a result of these features, even if the final displacement of the safety bar to its activated position is hampered, in particular due to poor positioning of the occupant on the seat, the final position of the safety bar after the activating device has been triggered is always on the dissipation trajectory between the above-mentioned intermediate position and the activated position so that the safety bar can then follow said dissipation trajectory as far as the end-of-travel position, gradually decelerating the occupant as kinetic energy is dissipated.

The safety bar is therefore able to fulfil its role effectively under any circumstances.

Preferred embodiments of the invention offer the option of using in addition one and/or the other of the following features:

connecting means comprising:

a support device which can be displaced relative to the seating element between a rest position on the one hand, in which the safety bar is spaced back from its activated position relatively speaking, and an activation position on the other, in which said safety bar is closer to its activated position, and locking means for immobilising the support device of the safety bar relative to the seating element when this support device reaches its activation position, the safety bar being movable, relative to this support device, between first and second stop positions corresponding respectively to the activated and end-of-travel positions of the safety bar when the support device is in its activation position, said safety bar being in an initial position part-way between said stop positions under normal circumstances, the support device, the activating device and the energy-dissipating means being designed so that when the activating device is triggered:

the support device is initially displaced from its rest position to its activation position without the safety bar being essentially displaced relative to the support device, after which said safety bar is displaced relative to the support device into its first stop position, corresponding to its activated position, and the safety bar is finally displaced relative to the support device from its first stop position to its second stop position, which corresponds to the end-of-travel position;

the activating device is designed to act on the safety bar so as to displace said safety bar to its activated position and to retain the safety bar in said activated position until a predetermined force is applied to said bar to shift it to its end-of-travel position, said predetermined force being less than a force applied to the safety bar by the activating device in order to displace it into its activated position;

the energy-dissipating means comprise a mechanical linking device which links the seating element to at least a part of the activating device, this mechanical linking device being designed to allow the safety bar to be displaced relative to its support device into its end-of-travel position when the safety bar is subjected to a force directed towards said end-of-travel position and at least equal to said predetermined force;

the activating device comprises a pyrotechnical actuator which drives a cable attached to the safety bar, which cable is linked to the seating element by said mechanical linking device;

changing direction, the cable passes over at least one return guide between the pyrotechnical actuator and the safety bar, the mechanical linking device comprising the return guide on the one hand and a linking element on the other which links the return guide to the seating element;

said linking element is a slot which is provided in a rigid element belonging to the seating element and which surrounds a rigid member joined to the return guide, the edges of this slot being sufficiently close together to prevent any displacement of the return guide relative to the seat under normal circumstances, and the edges of the slot being designed to move apart by plastic deformation to allow the return guide to be displaced forwards when the safety bar is subjected to a force directed towards the end-of-travel position and at least equal to said predetermined force;

said linking element has a plastically stretchable metal plate;

the support device of the safety bar has two lateral plates, each of which is movable on a side flange belonging to the seating element;

the safety bar extends between two longitudinal ends, each of which is slidably mounted in a slot belonging to the corresponding side plate;

the safety bar extends between two longitudinal ends, each of which comprises a pinion meshing with a rack formed on a level with a slot belonging to the corresponding side plate, the activating device comprising a single pyrotechnical actuator which is connected via a cable to a fixing member rotatably mounted on the safety bar in the vicinity of one of the longitudinal ends of said safety bar;

the seating element is the seat, the set-back position of the safety bar being located close to the front end of the seat, the activated position of said safety bar being located above and to the rear, relative to the set-back position, and the dissipation trajectory of the safety bar being oriented downwards and forwards;

the seating element is the backrest, the activated position of the safety beam being located towards the fore relative to the set-back position and the dissipation trajectory of the safety bar being substantially horizontal.

BRIEF DESCRIPTION OF THE DRAWINGS

Other features and advantages of the invention will become clear from the following description of several embodiments, given by way of example and not restrictive in any respect, with reference to the appended drawings.

Of the drawings:

FIGS. 8 and 9 show details of features illustrating different embodiments of the energy-dissipating system which can be fitted on the seat illustrated in FIGS. 1 to 7, FIG. 10 is a view similar to that of FIG. 1 showing a second embodiment of the invention, in which the seat is fitted with a safety bar which can be activated in the event of a rear impact.

MORE DETAILED DESCRIPTION

The same references are used in the different drawings to denote the same or similar components.

Figure 1:
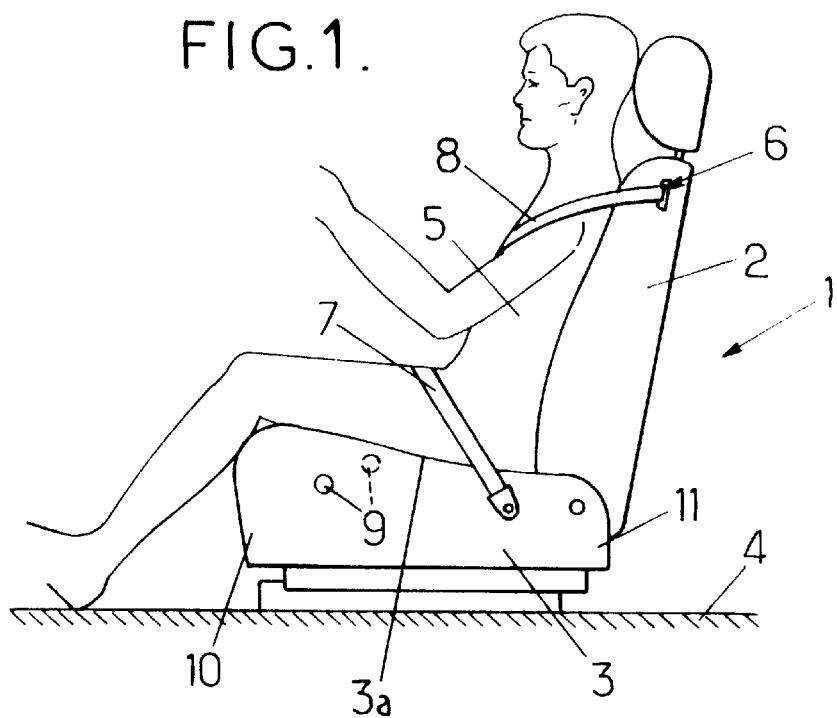
FIG. 1 is a schematic view of a first embodiment of a vehicle seat as proposed by the invention, the seat-part of which has a safety bar which can be activated in the event of impact.

FIG. 1 illustrates a seat 1 comprising a backrest 2 mounted on a seat 3 fixed to the floor 4 of the vehicle. The occupant 5 of the seat is fastened in by means of a safety belt 6, which conventionally comprises a ventral strap 7 and a thoracic strap 8.

In order to prevent the occupant 5 from sliding underneath the ventral strap 7 of the safety belt and digging into the upholstery of the seat 3 if the vehicle is subjected to a frontal impact, commonly referred to as "sub-marining" by those skilled in the art, a horizontal safety bar 9 is provided in the interior of the seat 3, located in the vicinity of the front end 10 and extending through the seat 3 perpendicular to the longitudinal direction of said seat.

In order to optimise both the comfort and safety of the occupant 5, the invention proposes a safety bar 9 which can be displaced between:

a set-back position shown by a solid line in FIG. 1, in which said safety bar does not essentially impinge on the thighs of the occupant and therefore causes him no discomfort, and an activated position, represented by a broken line in FIG. 1, in which the safety bar is shifted in a direction towards the rear end 11 of the seat and upwards, at which point said safety bar is close to the top face 3a or support surface of the seat, immediately underneath the thighs of the occupant 5 so as to prevent the pelvis of this occupant from shifting forwards underneath the ventral strap 7 of the safety belt.

Figure 2:
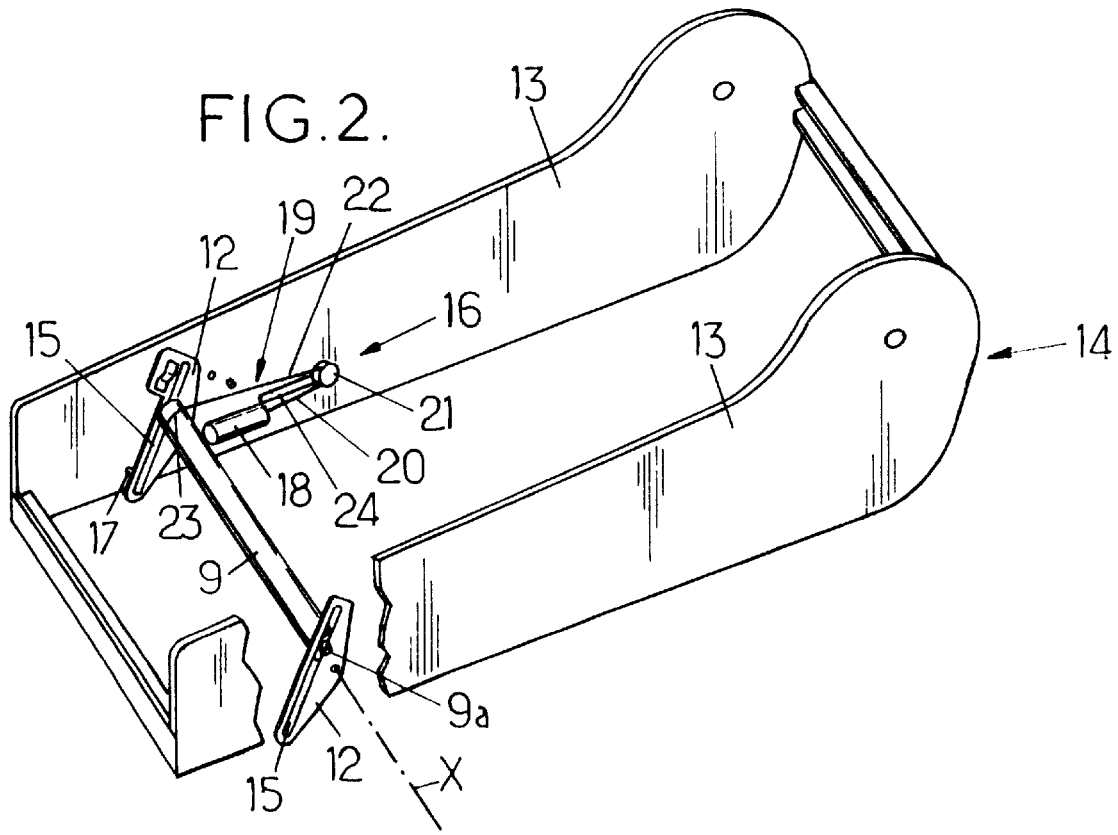
FIG. 2 is a perspective view of the frame of the seat-part of the seat illustrated in FIG. 1, with the safety bar in the set-back position.

To this end, as illustrated in FIG. 2, the safety bar 9 may be supported by at least one mobile support device comprising, in the example illustrated here, two metal side plates 12, each being mounted so as to pivot about a common axis of rotation X on one of the metal side flanges 13 of the frame 14 of the seat.

In this example, the safety bar 9 is in the form of a rigid metal tube extending between two longitudinal ends 9a, each of which is located in a slot 15 belonging to the corresponding side plate 12.

When the support device is in its rest position, illustrated in FIG. 2 and corresponding to the rest position of the safety bar, each slot 15 is directed upwards and slightly towards the rear, subtending an angle with the vertical that is preferably between 10 and 30 degrees and advantageously in the order of 20 degrees.

In addition, each end of the safety bar 9 is at this point disposed in an initial position part-way between the top and bottom ends of the corresponding slot 15, which form first and second stop positions for the bar 9.

The safety bar 9 and the plates 12 are normally retained in their rest position as illustrated in FIG. 2 by means of an activating device 16, which prevents:
  the plates 12 from pivoting forwards, these plates also being prevented from pivoting backwards whilst in the rest position either by the action of friction against the flanges 13 or by means of bosses 17 or other protrusions in the flanges 13,
  and any forward movement of the safety bar 9, which also prevents said safety bar 9 from moving downwards in the inclined slots 15 of the plates 12.

The activating device 16 may advantageously comprise:
  a pyrotechnical actuator 18 mounted on one of the side flanges 13, this actuator being of the type currently used as pre-tensioning devices for safety belts, it being possible for this actuator 18 to be joined in addition to one of the clamps of the safety belt 6 so that it will function as a means of both pre-tensioning the safety belt and activating the safety bar 9,
  and a metal cable 19, which is pulled by the actuator 18 when ignited.

This cable 19 comprises a first length 20 extending from the pyrotechnical actuator 18 to the rear as far as a return guide 21 such as a pulley or similar, which is supported on the flange 13 on which the actuator 18 is mounted. Beyond this return guide 21, the cable 19 extends in a second length 22 which runs towards the front as far as an end 23 attached directly to the safety bar 9, close to the end 9a of this bar corresponding to the activating device 16.

Figure 3:
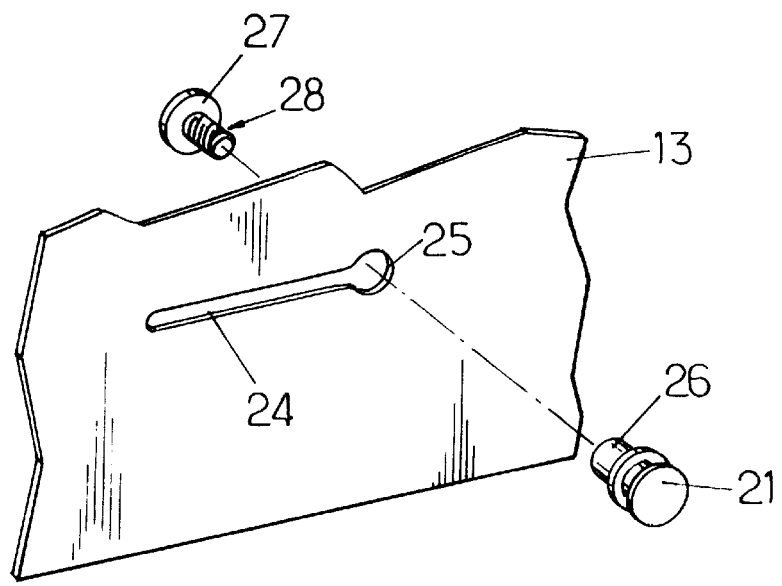
FIGS. 3 and 4 are detailed views of features illustrated in FIG. 2, FIGS. 5 to 7 are views of features showing how the safety bar of the seat illustrated in FIG. 1 is displaced if the vehicle in which this seat is fitted is subjected to a frontal impact.

As illustrated in FIG. 3, energy-dissipating means are also provided, designed to limit the reaction forces to which the thighs of the occupant are subjected if the vehicle is involved in an accident due to a frontal impact.

In the specific example illustrated in the drawings, these energy-dissipating means comprise a deformable slot 24 provided in the side flange 13 bearing the return guide 21.

This slot 24 has an enlarged rear end 25 in which a rigid solid central part 26 integral with the return member 21 locates, said return member 21 being wider than the central part 26 and bearing against the inner face of the side flange 13, whilst the enlarged head 27 of a screw 28 or similar, fixed to the central part 26 and wider than said central part 26, bears against the external face of said side flange 13.

The deformable slot 24 is designed to retain the return guide 21 at its enlarged rear end 25 under normal circumstances but the edges of the said slot 24 may be moved apart by plastic deformation when a force greater than a predetermined value, for example approximately 300 to 900 daN (deca Newton) is applied to the safety bar 9 from the front.

Figure 4:
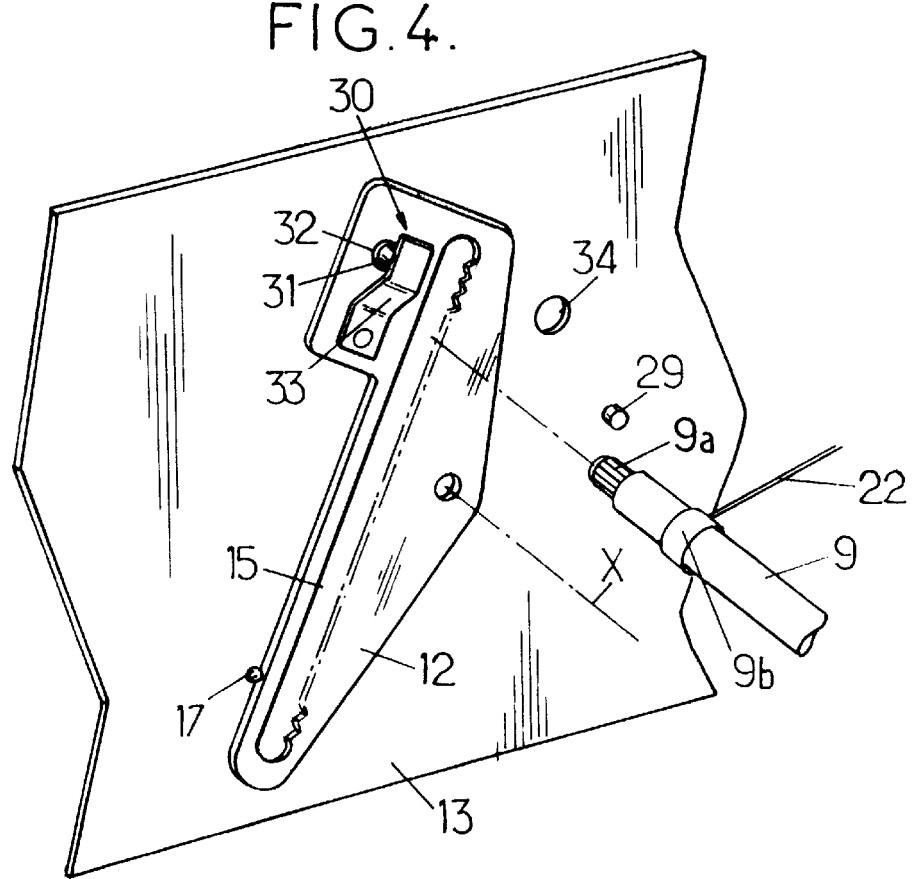

Furthermore, as illustrated in FIG. 4, means are provided to lock each plate 12 into a swung-back position or activation position in which the slot 15 of the plate extends upwards and towards the rear, preferably subtending an angle ranging between 60 and 80° with the vertical, and advantageously an angle in the order of 70°.

In the example illustrated, these locking means comprise:
  on the one hand a stop 29 integral with the corresponding side flange 13, which restricts the pivoting action of the plate 12 towards the rear,
  and, on the other, a catch 30 supported by the top end of the plate 12, this catch comprising a rigid pin 31 which is inserted through an orifice 32 provided in the plate and which is biassed against the inner face of the flange 13 by means of a resilient metal plate 33 supported by the plate, the pin 31 being designed to penetrate an orifice 34 provided in the flange 13 when the plate 12 moves into contact with the stop 29.

Finally, each of the slots 15 of the side plates 12 preferably has a rack 15a which co-operates with a pinion constituting all or part of the corresponding longitudinal end 9a of the safety bar 9. This guarantees that the safety bar 9 will remain horizontal when activated even though the length 22 of the cable 19 is attached close to one of the longitudinal ends of said safety bar. In this the case, the length 22 of the cable 19 is then fixed to the bar 9 by means of a rotating ring 9b which surrounds said bar or by means of any other rotating member what will allow the bar 9 to rotate freely as it is displaced in the slots 15.

As a variant, the activating device 16 could be provided with two pre-tensioning devices 18 and two cables located on either side of the seat, which would improve synchronisation of the movement of the two ends of the safety bar.

If the vehicle is subjected to a frontal impact, the device described above will operate as follows.

Figure 5:
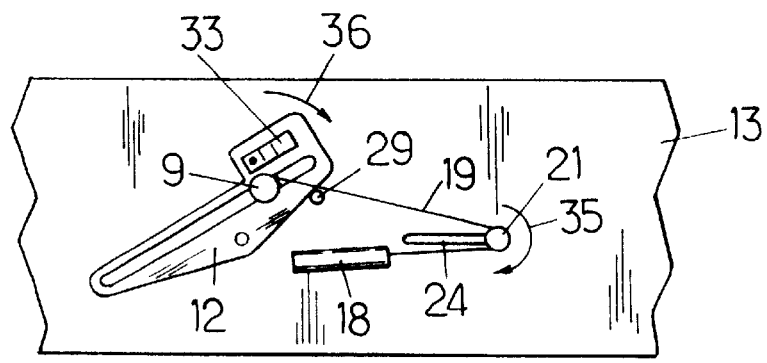

Initially, as illustrated in FIG. 5, the pyrotechnical actuator 18 is ignited, this actuator being controlled by a deceleration sensor or other impact sensor of a known type generally used for the pre-tensioning systems of safety belts.

The pyrotechnical actuator 18 then pulls on the cable 19 in the direction of the arrow 35, which firstly causes the plates 12 to pivot backwards in the direction of the arrow 36 until each plate reaches its rear stop position or activation position defined above. During this displacement, each plate 12 passes across the corresponding boss 17, being elastically deformed and/or deforming said boss.

This first movement is essentially effected without any relative displacement between the safety bar 9 and the plates 12, the pivoting motion of the plates 12 being easier than the upward movement of the bar 9 in the slides 15.

Figure 6:
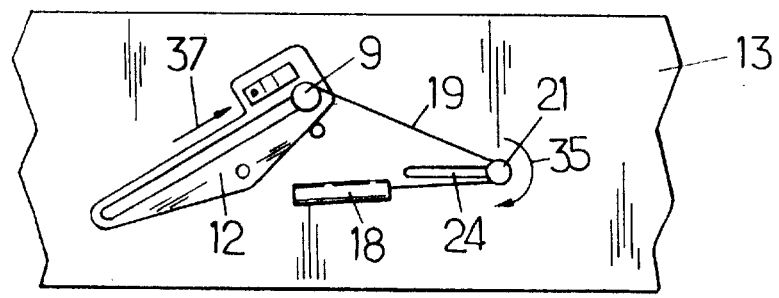

In a second phase, as illustrated in FIG. 6, once the plate 12 is in its activation position, the pyrotechnical actuator 18 continues to pull on the cable 19 in the direction of the arrow 35, which causes the safety bar 9 to move upwards in the slots 15 of the plates 12, in the direction of the arrow 37, as far as its top stop position.

The safety bar 9 is then in its activated position relative to the seat, in the immediate vicinity of the thighs of the occupant.

During this movement, the return guide 21 remains at the rear end of the slot 24, the forces applied to the cable 19 by the pyrotechnical actuator 18 not being great enough to force the return guide 21 to move forwards by plastically moving the edges of the narrow slot 24 apart.

Figure 7:
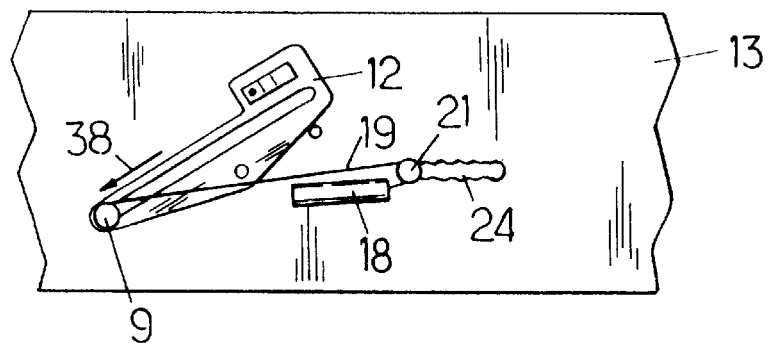

Then, as illustrated in FIG. 7, the pyrotechnical actuator 18 locks the cable 19 but once the occupant bears forwards and downwards on the safety bar 9 due to the effect of the inertia, exerting a force greater than the above-mentioned predetermined value, the central part 26 of the return guide 21 is displaced forwards in the slot 24, plastically moving the edges of this slot apart.

This allows the safety bar 9 to be displaced forwards and downwards, applying a decelerating action in the direction of the arrow 38 along the slots 15 of the plates 12, as far as a bottom stop position or end-of-travel position, across a total dissipation course which may be as much as about 20 to 25 cm, for example.

Clearly, other energy-dissipating means could be used instead of or in addition to the deformable slot 24, in particular:

- a plastically deformable linking member, linking the return guide 21 to the corresponding side flange 13, for example,
- a plate of corrugated sheeting 39 such as illustrated in FIG. 8,
- or a plate of flat sheeting 40 but having transverse slots 41 and preferably corrugated edges 42, as illustrated in FIG. 9,
- a pyrotechnical actuator 18 capable of gradually releasing the cable 19 after having pulled it, exerting a decelerating action during this releasing action,
- a pyrotechnical actuator 18 mounted on the corresponding side flange 13 by means of a force-limiting device in turn having a deformable slot similar to the slot 24 provided in the flange 13 or another plastically deformable fixing member.

As a variant, the slots 15 could also each be formed in an intermediate sheet fixed onto the corresponding plate 12 and each could have catches in the form of ratchets or similar distributed along their length in order to lock the safety bar 9 in the uppermost position it reaches when the activating device 16 is operating. Each intermediate sheet would then be joined to the corresponding plate 12 by an energy-dissipater, for example a deformable slot which receives a pin wider than itself so as to allow the safety bar to be displaced with its two intermediate sheets towards its end-of-travel position, dissipating the energy as it does so.

In the second embodiment of the invention, which is illustrated in FIG. 10, the safety bar 9 is not arranged at the front end of the seat but in the backrest 2, substantially on a level with the lower back of the occupant 5.

As above, this safety bar 9 can be displaced between:

- on the one hand, a set-back position located towards the rear, in which the safety bar does not essentially impinge upon the occupant 5,
- and, on the other, an activated position shown by broken lines and located towards the front, in which said safety bar is located closer to the front face 2*a* of the backrest so as to restrict and decelerate the displacement of the pelvis of the occupant towards the rear if the vehicle in which the seat is fitted is subjected to a rear impact.

Figure 11:
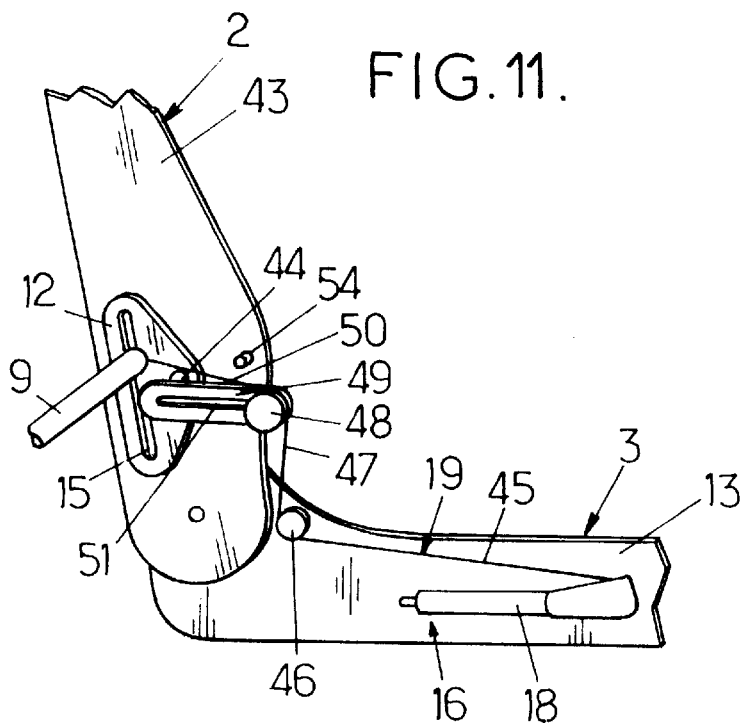
FIG. 11 is a perspective view of a part of the seat frame illustrated in FIG. 10, with the safety bar in the set-back position.

As illustrated in FIG. 11, the safety bar 9 may be mounted by means of two side plates 12, each having a slot 15 in which a longitudinal end of the bar 9 locates, in exactly the same or a similar manner to the first embodiment.

Each plate 12 is joined to the corresponding side flange 43 of the frame of the backrest by means of a pivot 44 and said plate is initially located in a rest position in which its slot 15 is disposed substantially vertically to the rear of the pivot 44. The plates 12 may be retained in their rest position by friction against the flanges 43 or by any other means, in particular by bosses of the flanges 43, similar to the bosses 17 described above.

In addition, the safety bar 9 is initially located in a position part-way between the top and bottom ends of the slots 15, constituting respectively first and second stop positions for the bar 9. The safety bar 9 may be retained in this position by means of friction or by any other known means.

Furthermore, as with the first embodiment of the invention, the safety bar 9 is joined to an activating device 16 comprising, at least at one side of the seat:

- a pyrotechnical actuator 18 secured to one of the flanges 13 of the seat,
- and a metal cable 19 attached close to the corresponding longitudinal end of said bar as was the case with the first embodiment of the invention.

This cable 19 comprises:

- a first length 45 extending from the actuator 18 towards the rear as far as a first return guide such as a pulley or similar 46, fixed onto the flange 13,
- a second length 47 which extends from the first return guide 46 upwards as far as a second return guide 48 such as a pulley or similar, which is mounted at the front end of a plate 49 attached to the corresponding backrest flange 43,
- and a third length 50 which extends from the second return guide 48 towards the rear as far as the bar 9.

The second return guide 48 is similar to the return guide 21 described above and is initially fixed to the enlarged front end of a narrow slot 51, similar to the slot 24 described with reference to the first embodiment of the invention.

Figure 12:
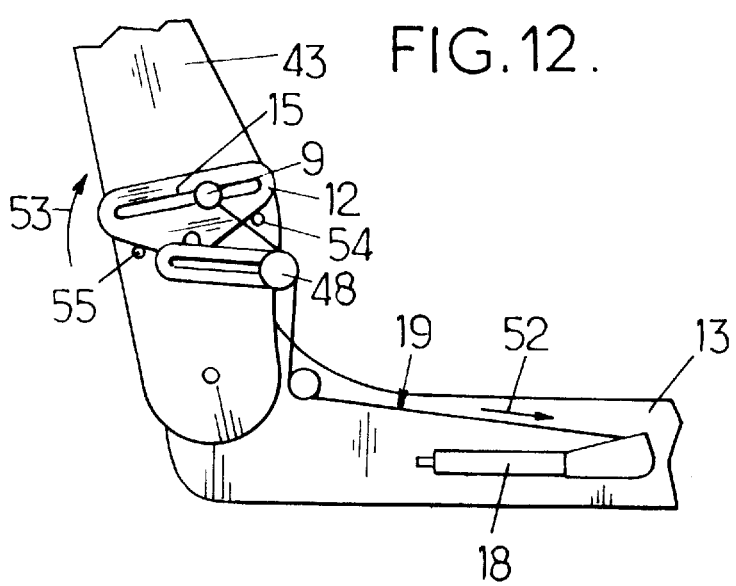
FIG. 12 is a side view of the frame illustrated in FIG. 11, with the safety bar in a first phase of displacement after the vehicle has been subjected to a rear impact.

If the vehicle in which the seat is fitted is subjected to a rear impact, the pyrotechnical actuator 18 is triggered, in a manner known per se, and pulls on the cable 19 in the direction of the arrow 52, as illustrated in FIG. 12, which causes the plates 12 to pivot forwards in the direction of the arrow 53 until said plates move into contact with a front stop 54 provided on the backrest flange 43.

Figure 13:
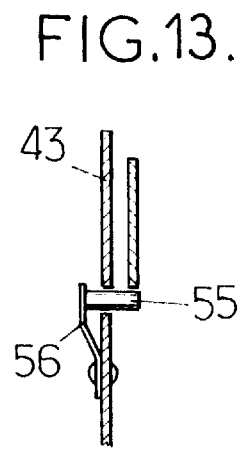
FIG. 13 is a view of a feature from FIG. 12, and FIGS. 14 and 15 are views similar to that of FIG. 12, showing two subsequent stages of the safety bar as it is displaced when the vehicle is subjected to a rear impact.

In addition, as illustrated in FIG. 13, a rigid pin 55 which is inserted horizontally through the backrest flange 43 and which is biassed towards the interior of said backrest by a leaf spring 56, then locates at the rear of the plate 12 to prevent it from returning to its rest position. At this point, the slots 15 are disposed essentially horizontally.

Figure 14:
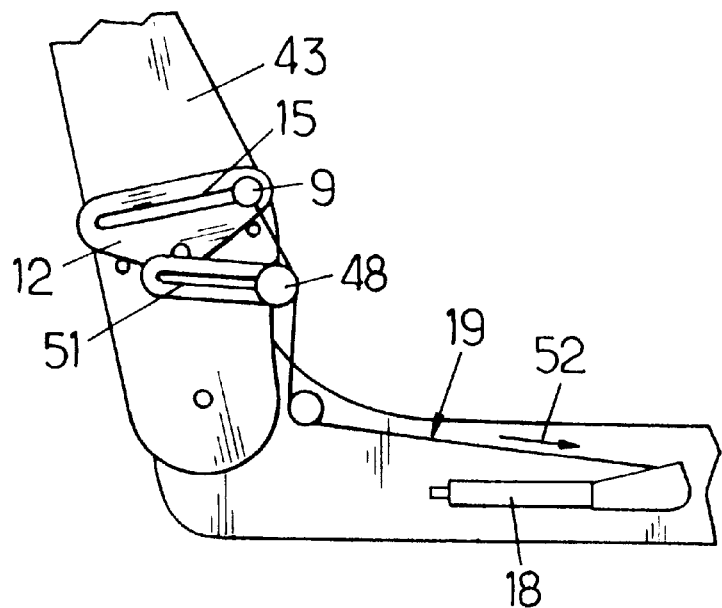

Then, as illustrated in FIG. 14, the pyrotechnical actuator 18 continues to displace the cable 19 in the direction of the arrow 52, which causes the safety bar 9 to move forward in the slots 15 of the plates 12 as far as the first stop position of the slots 15, corresponding to the activated position of the bar 9.

During this movement, the second return guide 48 remains at the front end of the slot 51 of the plate 49, the force applied to the cable 19 by the pyrotechnical actuator 18 not being great enough to force the second return guide 48 to be displaced towards the rear by plastically moving the edges of the narrow slot 51 apart.

Figure 15:
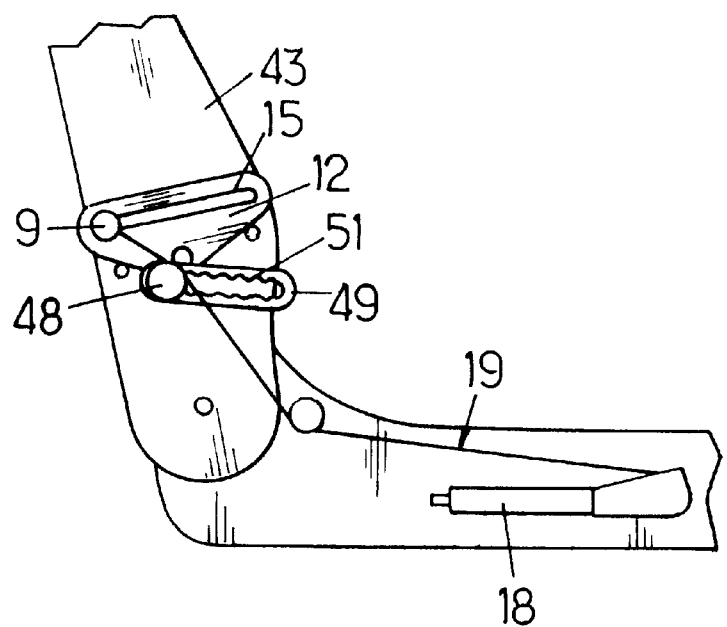

Finally, as illustrated in FIG. 15, the lower back of the occupant 5 of the seat is pushed into the backrest under the effect of the rear impact to which the vehicle has been subjected and is largely supported on the safety bar 9 pulling the cable, which is locked by the actuator 18.

If the force thus applied to the safety bar 9 does not exceed a predetermined threshold, for example in the order of 300 to 900 daN, the second return guide 48 is displaced towards the rear applying a decelerating action as it plastically moves the edges of the slot 51 apart under the action of the tension on the cable 19, which allows the bar 9 to be displaced towards the rear in the slots 15 as far as the second stop position of said slots or end-of-travel position.

The safety bar 9 therefore follows a dissipation path which may be relatively long (in the order of 15 to 25 cm, for example), the start of which corresponds to the final portion of the activation trajectory of said safety bar.

In the two embodiments of the invention described above, if the dimensions of the device permit, it would be conceivable for the plates 12 (or other devices supporting the bar 9) to be fixed respectively relative to the seat flanges 13 or backrest flanges 43. The plates 12 would then be oriented as in their activation position described above (FIGS. 5 and 12 respectively). This being the case, the safety bar 9 would undergo a two-stage movement only, when the pre-tensioning device 18 is triggered:

a first stage of sliding in the slots 15 towards the first stop position (top position in the first embodiment and front position in the second embodiment), and a second stage of sliding towards the second stop position accompanied by a dissipation of energy (bottom position in the first embodiment and rear position in the second embodiment).

We claim:

1. A vehicle seat comprising:

a backrest, a seat extending in a longitudinal direction between a front end and a rear end adjacent to the backrest, a safety bar extending horizontally, perpendicular to the longitudinal direction, inside a seating element selected from the seat and the backrest, this seating element having a support surface designed to support an occupant, the safety bar being designed to restrict displacement of the occupant in a certain direction of displacement in the event of an accident, said safety bar being arranged, under normal circumstances, in a set-back position relative to the seating element, which is spaced back from the support surface, relatively speaking, connecting means for connecting the safety bar to the seating element, at least one activating device which can be triggered in the event of an accident in order to displace the safety bar relative to the seating element from its set-back position into an activated position closer to the support surface of the seating element, the connecting means being designed so that the safety bar follows a predetermined activation trajectory relative to the seating element until it reaches said activated position, and energy-dissipating means designed to decelerate the safety bar as it is displaced from its activated position to an end-of-travel position, during which it follows a certain dissipation trajectory directed substantially in the direction in which the occupant is displaced in the event of an accident, wherein the connecting means are designed so that the activation trajectory followed by the safety bar relative to the seating element comprises at least one portion common to the dissipation trajectory, this portion of the activation trajectory commencing at an intermediate point on the dissipation trajectory and continuing as far as the activated position.

2. A seat as claimed in claim 1, in which the connecting means comprise:

a support device which can be displaced relative to the seating element between a rest position on the one hand, in which the safety bar is relatively spaced back from its activated position, and an activation position on the other, in which said safety bar is closer to its activated position, and locking means for immobilising the support device of the safety bar relative to the seating element when this support device reaches its activation position, the safety bar being movable, relative to this support device, between first and second stop positions corresponding respectively to the activated and end-of-travel positions of the safety bar when the support device is in its activation position, said safety bar being in an initial position part-way between said stop positions under normal circumstances, the support device, the activating device and the energy-dissipating means being designed so that when the activating device is triggered:

the support device is initially displaced from its rest position to its activation position without the safety bar being essentially displaced relative to the support device, after which said safety bar is displaced relative to the support device into its first stop position, corresponding to its activated position, and the safety bar is finally displaced relative to the support device from its first stop position to its second stop position, which corresponds to the end-of-travel position.

3. A seat as claimed in claim 2, in which the activating device is designed to act on the safety bar so as to displace said safety bar to its activated position and to retain the safety bar in said activated position until a predetermined force is applied to said bar to shift it to its end-of-travel position, said predetermined force being less than a force applied to the safety bar by the activating device in order to displace it into its activated position.

4. A seat as claimed in claim 3, in which the energy-dissipating means comprise a mechanical linking device which links the seating element to at least a part of the activating device, this mechanical linking device being designed to allow the safety bar to be displaced relative to its support device into its end-of-travel position when the safety bar is subjected to a force directed towards said end-of-travel position and at least equal to said predetermined force.

5. A seat as claimed in claim 4, in which the activating device comprises a pyrotechnical actuator which drives a cable attached to the safety bar, which cable is linked to the seating element by said mechanical linking device.

6. A seat as claimed in claim 5, in which, changing direction, the cable passes over at least one return guide between the pyrotechnical actuator and the safety bar, the mechanical linking device comprising the return guide on the one hand and a linking element on the other which links the return guide to the seating element.

7. A seat as claimed in claim 6, in which said linking element is a slot which is provided in a rigid element belonging to the seating element and which surrounds a rigid member joined to the return guide, the edges of this slot being sufficiently close together to prevent any displacement of the return guide relative to the seat under normal circumstances, and the edges of the slot being designed to move apart by plastic deformation to allow the return guide to be displaced forwards when the safety bar is subjected to a force directed towards the end-of-travel position and at least equal to said predetermined force.

8. A seat as claimed in claim 6, in which said linking element comprises a plastically stretchable metal plate.

9. A seat as claimed in claim 2, in which the support device of the safety bar has two side plates each of which is mounted so as to pivot on a side flange belonging to the seating element.

10. A seat as claimed in claim 9, in which the safety bar extends between two longitudinal ends, each of which is able to move in a slot belonging to the corresponding side plate.

11. A seat as claimed in claim 9, in which the safety bar extends between two longitudinal ends, each of which comprises a pinion meshing with a rack formed on a level with a slot belonging to the corresponding lateral plate, the activating device comprising a single pyrotechnical actuator which is connected via a cable to a fixing member rotatably mounted on the safety bar in the vicinity of one of the longitudinal ends of said safety bar.

12. A seat as claimed in claim 1, in which the seating element is the seat, the set-back position of the safety bar being located close to the front end of the seat, the activated position of said safety bar being located above and to the rear, relative to the set-back position, and the dissipation trajectory of the safety bar being oriented downwards and forwards.

13. A seat as claimed in claim 1, in which the seating element is the backrest, the activated position of the safety bar being located to the fore relative to the set-back position and the dissipation trajectory of the safety bar being substantially horizontal.

* * * * *